(12) United States Patent
Biggs et al.

(10) Patent No.: US 7,127,531 B2
(45) Date of Patent: Oct. 24, 2006

(54) SYSTEM AND METHOD FOR PROCESSING COMPUTER I/O PORT POST CODES

(75) Inventors: Kent Biggs, Tomball, TX (US); Juan Ignacio Martinez, Tomball, TX (US); Scott Mark Wiginton, Tomball, TX (US)

(73) Assignee: Hewlett-Packard Development Company, I.P., Houston, TX (US)

( * ) Notice: Subject to any disclaimer, the term of this patent is extended or adjusted under 35 U.S.C. 154(b) by 290 days.

(21) Appl. No.: 10/769,445

(22) Filed: Jan. 30, 2004

(65) Prior Publication Data
US 2005/0172038 A1 Aug. 4, 2005

(51) Int. Cl.
*G06F 3/00* (2006.01)

(52) U.S. Cl. .................. 710/5; 710/1; 710/15; 710/19

(58) Field of Classification Search .................... None
See application file for complete search history.

(56) References Cited

U.S. PATENT DOCUMENTS 6,615,288 B1 *  9/2003  Herzi ........................ 710/10
6,807,629 B1 * 10/2004  Billick et al. ................ 713/2
6,910,157 B1 *  6/2005  Park et al. .................. 714/36

* cited by examiner

*Primary Examiner*—Kim Huynh
*Assistant Examiner*—Richard B. Franklin
(74) *Attorney, Agent, or Firm*—Kevin M. Hart

(57) ABSTRACT

A preferred embodiment of the invention enables I/O port POST codes to be accessed via a universal serial bus ("USB") port of the computer system: BIOS writes an I/O port POST code to a USB port. A device coupled to the USB port reads the I/O port POST code and presents the code on a display.

5 Claims, 3 Drawing Sheets

SYSTEM AND METHOD FOR PROCESSING COMPUTER I/O PORT POST CODES

FIELD OF THE INVENTION

This invention relates generally to computer test and diagnostic equipment.

BACKGROUND

Almost immediately after a typical computer system is powered on, the basic input-output services ("BIOS") firmware performs a series of brief tests on some of the more fundamental hardware components of the system such as the central processing unit, memory, display controller and keyboard controller. This series of tests is commonly known as the power-on self test ("POST"). The POST is capable of generating a variety of error messages as a result of performing its routines, and can halt the boot process in addition to generating error messages if it discovers severe problems. The error messages generated by the POST normally take three different forms: audio codes, display-screen messages, and hexadecimal numeric codes sent to an input/output port address. The latter form will be referred to hereinafter as "I/O port POST codes".

The I/O port POST codes are useful during the prototype phase of motherboard development and also when diagnosing failures in systems that lock or hang during POST. Because the POST runs before even the operating system has been loaded, I/O port POST codes often represent the best available information about problems in the system. The most common prior art method for extracting I/O port POST codes is to place a special-purpose printed circuit board into one of the PCI or ISA expansion slots of the computer system. The special-purpose printed circuit board monitors the expansion bus to detect writes to certain I/O ports, and displays the information written to those ports on an LED display.

Such prior art circuit boards are inconvenient to use for a variety of reasons. In some computer systems, it is not even possible to use them because of expansion slot crowding or because expansion slots are not provided.

SUMMARY OF THE INVENTION

A preferred embodiment of the invention enables I/O port POST codes to be accessed via a universal serial bus ("USB") port of the computer system: BIOS writes an I/O port POST code to the USB port. A device coupled to the USB port reads the I/O port POST code and presents the code on a display.

DETAILED DESCRIPTION OF THE PREFERRED EMBODIMENTS

Figure 1:
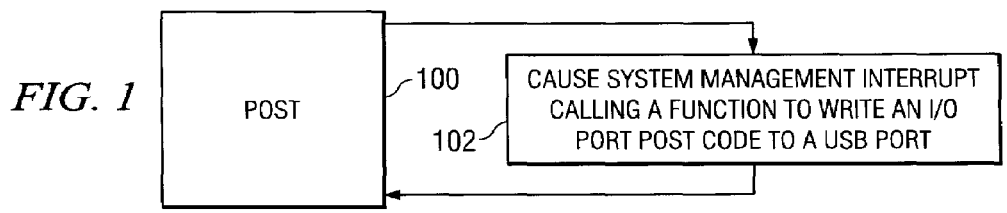
FIG. 1 is a flow diagram illustrating modifications to a POST routine according to a preferred embodiment of the invention.
Figure 2:
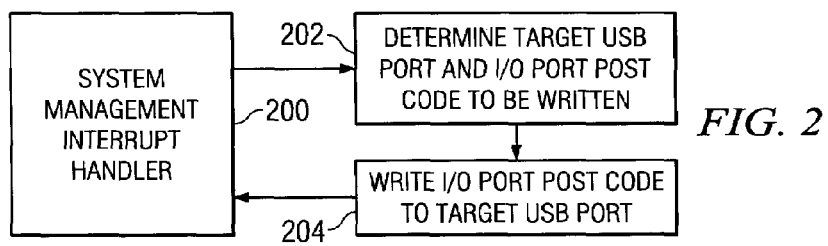
FIG. 2 is a flow diagram illustrating modifications to a system management interrupt handler according to a preferred embodiment of the invention.
Figure 3:
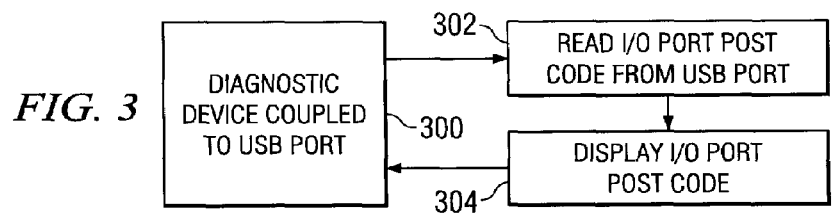
FIG. 3 is a flow diagram illustrating functionality of a USB port diagnostic device according to a preferred embodiment of the invention.

Referring now to FIGS. 1–3, a conventional POST portion 100 of BIOS firmware may be modified by adding the new functionality of step 102. Namely, when the POST generates an I/O port POST error code, it also causes a system management interrupt in step 102. The system management interrupt should call a function whose purpose is to write the error code to a USB port. (The I/O port POST code can be written to a USB port regardless of whether it is actually written to an I/O port.) A corresponding modification may be made to a conventional system management interrupt handler 200 to add the new function. When called by the interrupt of step 104, the new function should perform steps 202 and 204. In step 202, the function determines which error code should be written, and to which USB port (the "target" USB port). This may be accomplished by several means including, for example, passing parameters from the POST to the interrupt handler through CPU registers. In step 204, the function writes the error code to the target USB port. The functionality illustrated in FIGS. 1 and 2 may be implemented entirely in BIOS firmware. A diagnostic device 300 may be coupled to the target USB port of the host computer. Device 300 should be programmed to read error codes from the target USB port in step 302 and to display them in step 304.

Figure 4:
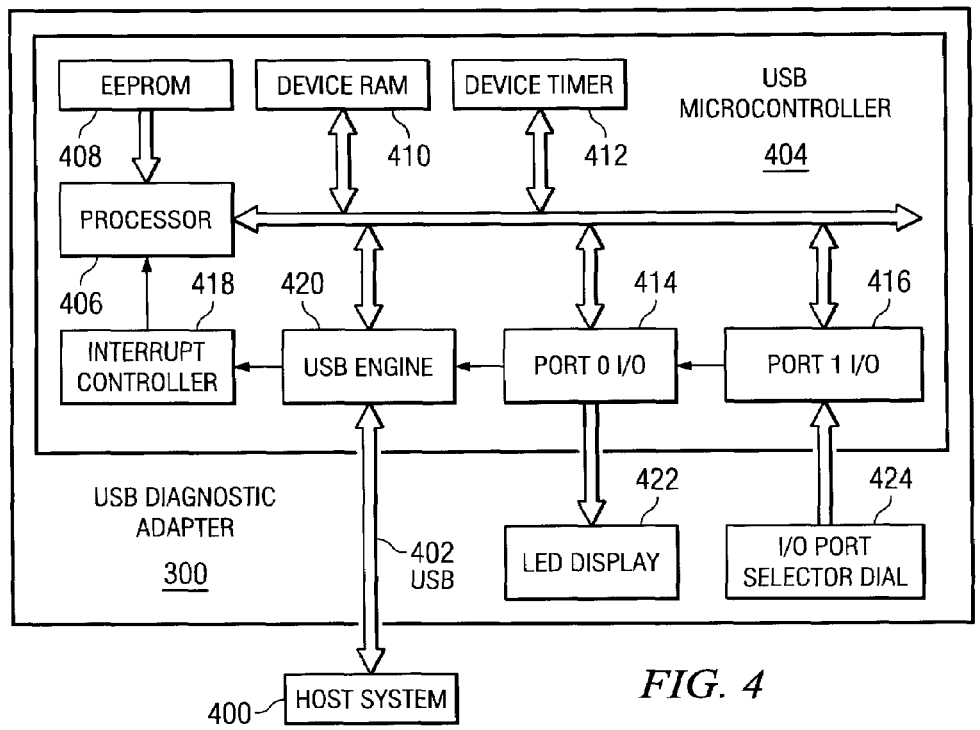
FIG. 4 is a block diagram illustrating the USB port diagnostic device of FIG. 3 coupled to a host computer system.

Device 300 may take a variety of forms. One preferred implementation of such a device is illustrated in FIG. 4, which depicts a USB diagnostic device 300 coupled to a host computer system 400 via a USB interface 402. Device 300 may be constructed with discrete components or around a generic USB microcontroller 404. One such microcontroller is, for example, the model CY7C 63000A microcontroller from Cypress Semiconductor, Inc. A generic USB microcontroller will typically include: a programmable processor 406, an EEPROM 408 for storing program code, RAM 410 for executing the code, a timer 412 for signaling the expiration of programmed intervals, two or more ports 414–416 for input/output, an interrupt controller 418 for signaling to the processor when an input/output event needs to be serviced, and a USB engine 420 for implementing basic aspects of the well-known USB protocol. (Any version of the USB protocol may be employed, such as version 1.1, version 2.0, or later versions.)

As shown in the drawing, preferably a display system 422 is coupled to input/output port 414, and a port selector dial 424 may be coupled to input/output port 416. Display system 422 may take a variety of forms. For example, a two-digit LED readout will be sufficient to display a typical two-digit hexadecimal error code. If two or more of such readouts are provided, then error codes from a corresponding number of I/O ports may be displayed simultaneously. The function of port selector dial 424 is to allow a user to select which I/O ports of host computer system 400 he or she would like device 300 to monitor. For example, many computers write I/O port POST codes to port 80h, while others write I/O port POST codes to port 84h. And, typically, computers use I/O ports in pairs for this purpose. For example, related codes are often written to ports 80h and 81h, or to ports 84h and 85h. Selector dial 424 maybe configured to select any number of I/O ports for monitoring, including paired ports. While one or more eight-bit dial switches may be used to implement port selector dial 424, alternative types of input devices may also be employed in lieu of or in addition to a dial switch.

Figure 5:
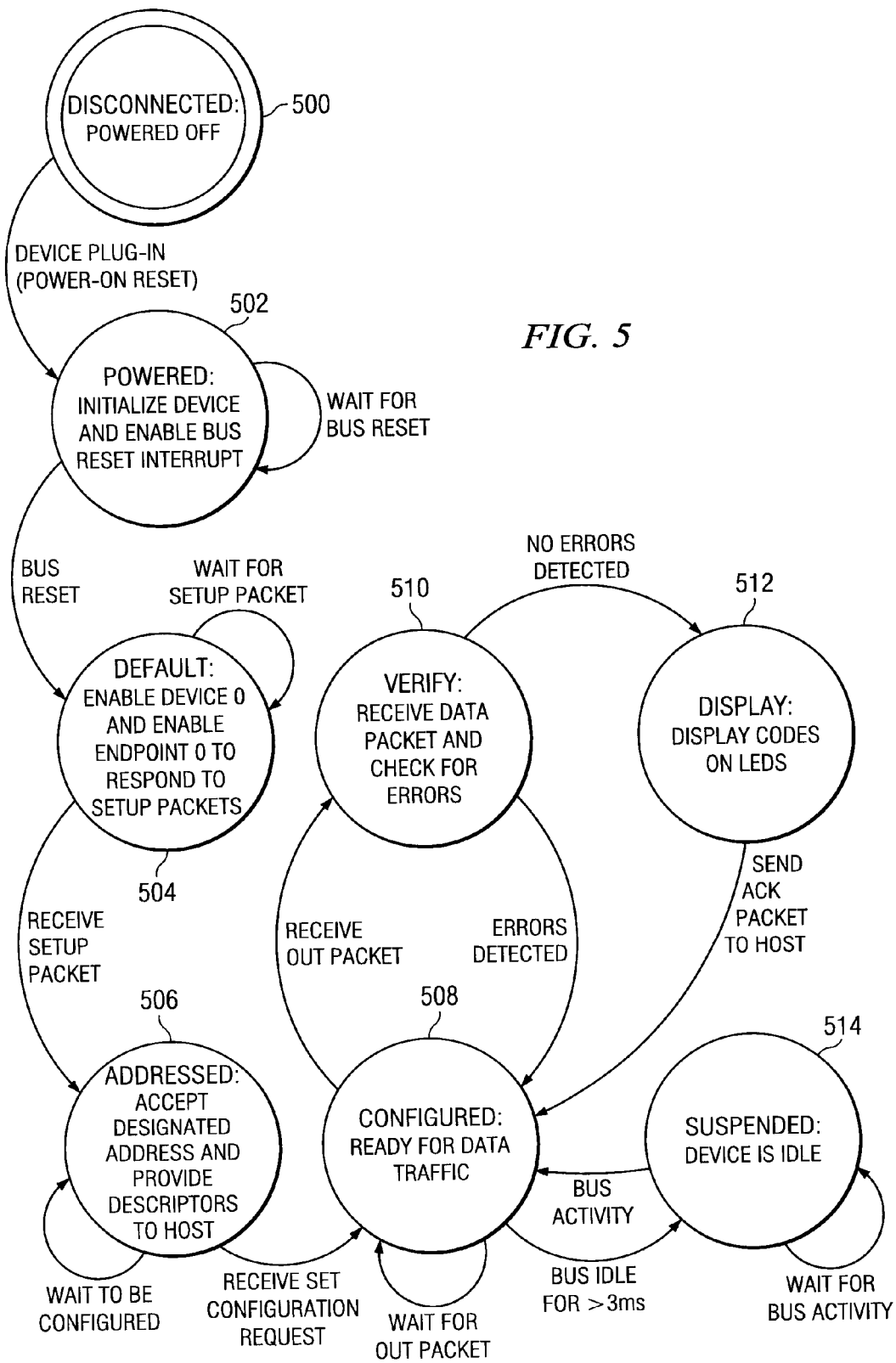
FIG. 5 is a state diagram illustrating preferred functionality of the USB port diagnostic device of FIG. 3.

The state diagram of FIG. 5 illustrates preferred functionality for programming into device 300. In the context of the following discussion, familiarity with one or more versions of the well-known USB interface specification will be assumed. Starting from disconnected and powered-off state 500, device 300 may be plugged into USB port 402. It should then enter state 502 in which it initializes itself, enables a USB bus reset interrupt, and waits for a USB bus reset. Upon sensing a USB bus reset, device 300 then enters state 504. In step 504 it enables USB device 0 and endpoint 0 and waits for a SETUP packet from host 400. When a SETUP packet is received, the device enters state 506 in which it accepts a designated address and provides its descriptors to host 400. After a series of GET/SET CONFIGURATION commands during which configuration, interface and endpoint descriptor information is exchanged between device 300 and host 400, the device finally enters state 508. In state 508, the device is ready to receive for error code traffic sent from host 400 in the form of OUT packets.

Device 300 and the BIOS firmware of host 400 should both be programmed to have consistent interpretations of the contents of OUT packets. For example, two bytes of an OUT packet might be used to transmit error codes from two different I/O ports of host 400. (Each error code is one byte in length.) When device 300 receives an OUT packet, it should verify in state 510 whether the packet contained errors. If errors are detected, USB protocol should be followed to stimulate resending of the packet by host 400. Otherwise, device 300 should enter state 512, in which it presents the error code or codes from the OUT packet on display system 422. It should also send an acknowledgment of the OUT packet to host 400 and finally return to state 508 to wait for more error codes to display. In the event of USB inactivity lasting more than 3 ms, the device may enter suspended state 514 in accordance with the USB specification. It would then reenter state 508 upon sensing further USB activity.

Figure 6:
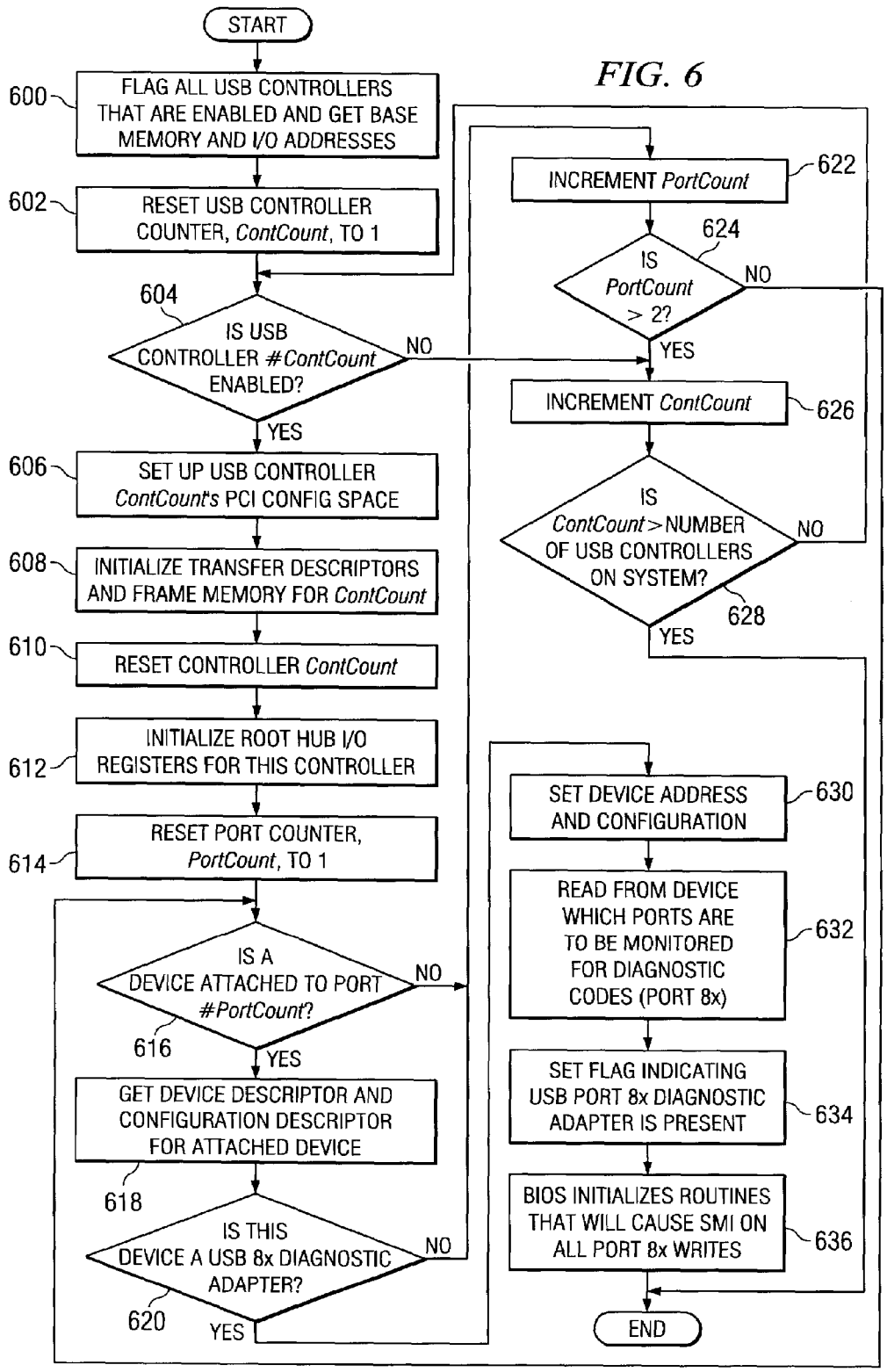
FIG. 6 is a flow diagram illustrating modifications to a BIOS initialization routine according to a preferred embodiment of the invention.

FIG. 6 illustrates modifications that may be made to BIOS initialization routines to support the above-described new functionality. Steps 600–628 comprise a loop whose purpose is to search for the presence of a USB diagnostic device 300 on any of the USB ports of host system 400. If one such device is found, then steps 630–636 are performed to initialize both the BIOS and the device for cooperative operation. In step 600, the BIOS flags all USB controllers in system 400 that are enabled, and gathers base memory and input/output addresses for those controllers. Then, using a counter variable "contCount," the BIOS steps through each of the controllers of the system as indicated in steps 602, 604, 626 and 628.

For each enabled controller, the following occurs: initialization of peripheral component interconnect ("PCI") space for the controller (step 606); transfer of descriptors and frame memory for the controller (step 608); reset of the controller (step 610); and initialization of root hub input/output registers for the controller (step 612). Next, the loop comprising steps 614–624 examines each of the USB ports on the controller to look for a USB diagnostic device 300. If such a device is found, then steps 630–636 are performed.

In step 630, the BIOS sets the address and configuration for the found device 300. In step 632, the BIOS determines from device 300 which I/O ports of host 400 are going to be monitored for error codes. This may be accomplished, for example, by reading selector dial 424. (Steps 630 and 632 correspond to state 506 in FIG. 5 as well as the transition from state 506 to state 508.) In step 634, the BIOS may set an internal flag indicating that a diagnostic device 300 is present. Finally, in step 636, the BIOS should initialize routines for causing the above-described system management interrupt each time an error code is written to one of the designated I/O ports.

What is claimed is:

1. A method for processing an I/O port POST code generated by BIOS executing in a computer, comprising:
   in the BIOS:
      causing a system management interrupt;
   in a system management interrupt handler:
      determining a target USB port to which the I/O port POST code should be written; and
      writing the I/O port POST code to the target USB port; and
   in a device coupled to the USB port:
      reading the I/O port POST code; and
      presenting the I/O port POST code on a display.

2. A method for processing an I/O port POST code generated by a POST routine executing in a computer, comprising:
   in the POST routine:
      causing a system management interrupt whose purpose is to forward the I/O port POST code to a USB port; and
   in a system management interrupt handler:
      determining a target USB port to which the I/O port POST code should be forwarded; and
      writing the I/O port POST code to the target USB port.

3. The method of claim 2, further comprising:
   in a device coupled to the target USB port:
      reading the I/O port POST code; and
      presenting the I/O port POST code on a display.

4. A computer system, comprising:
   means for generating an I/O port POST code;
   means for causing a system management interrupt identifying the I/O port POST code; and
   means, responsive to the system management interrupt, for determining a target USB port to which the I/O port POST code should be written and to write the I/O port POST code to the target USB port.

5. The computer system of claim 4, further comprising:
   a device coupled to the USB port, the device operable to read the I/O port POST code from the USB port and to present the I/O port POST code on a display.

* * * * *

UNITED STATES PATENT AND TRADEMARK OFFICE
CERTIFICATE OF CORRECTION

| | |
|---|---|
| PATENT NO. | : 7,127,531 B2 |
| APPLICATION NO. | : 10/769445 |
| DATED | : October 24, 2006 |
| INVENTOR(S) | : Kent Biggs et al. |

It is certified that error appears in the above-identified patent and that said Letters Patent is hereby corrected as shown below:

On the face page, in field (73), in "Assignee", in column 1, line 2, delete "I.P." and insert -- L.P. --, therefor.

Signed and Sealed this

Sixteenth Day of December, 2008

JON W. DUDAS
*Director of the United States Patent and Trademark Office*